US012452595B2

(12) United States Patent
Lan

(10) Patent No.: US 12,452,595 B2
(45) Date of Patent: Oct. 21, 2025

(54) COMBO SYSTEM AND METHOD OF DRIVING COMBO SYSTEM

(71) Applicant: AAC Technologies (Nanjing) Co., Ltd., Jiangsu (CN)

(72) Inventor: Ruizhi Lan, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 172 days.

(21) Appl. No.: 18/399,778

(22) Filed: Dec. 29, 2023

(65) Prior Publication Data

US 2024/0340586 A1 Oct. 10, 2024

Related U.S. Application Data

(63) Continuation of application No. PCT/CN2023/087034, filed on Apr. 7, 2023.

(51) Int. Cl.
*H04R 3/04* (2006.01)

(52) U.S. Cl.
CPC .................................... *H04R 3/04* (2013.01)

(58) Field of Classification Search
CPC . H04R 3/04; H04R 3/00; H04R 3/007; H04R 29/001; H04R 3/002; H03F 1/3247; H03F 1/3241
See application file for complete search history.

(56) References Cited

U.S. PATENT DOCUMENTS

2012/0106750 A1* 5/2012 Thormundsson ...... H04R 3/007 381/71.1
2019/0200146 A1* 6/2019 Button .................. H04R 3/007

FOREIGN PATENT DOCUMENTS

CN 115226007 A * 10/2022 ............... H04R 9/02
EP 3240302 A1 * 11/2017 ............... H04R 3/00

* cited by examiner

*Primary Examiner* — Yogeshkumar Patel
(74) *Attorney, Agent, or Firm* — Wiersch Law Group

(57) ABSTRACT

A Combo system and a method of driving the Combo system are provided. The Combo system includes a loudspeaker, a motor, an analog frequency divider, a power amplifier, a signal fuser, a nonlinear compensator, and a frequency-division predictor. The nonlinear compensator pre-distorts a digital signal of the loudspeaker to obtain a loudspeaker pre-distorted digital signal. The signal fuser fuses the loudspeaker pre-distorted digital signal with a digital signal of the motor to obtain a fused digital signal. The frequency-division predictor predicts voltage data loaded on two ends of the loudspeaker if the fused digital signal is transmitted to the analog frequency divider and divided by the analog frequency divider. The nonlinear compensator corrects the loudspeaker pre-distorted digital signal based on the voltage data to enable the loudspeaker analog signal to be consistent with the loudspeaker pre-distorted digital signal.

16 Claims, 8 Drawing Sheets

COMBO SYSTEM AND METHOD OF DRIVING COMBO SYSTEM

TECHNICAL FIELD

The present disclosure relates to the field of signal processing, and in particular to a Combo system and a method of driving a Combo system.

BACKGROUND

In the related art, a Combo component (i.e., one sound and tactile integrated component) is generally driven by a power amplifier. The Combo component includes a loudspeaker, a motor connected in series with the loudspeaker, and an analog frequency divider connected to the loudspeaker and the motor. In practice, the power amplifier receives a fused digital signal that fuses a digital signal of the loudspeaker with a digital signal of the motor; converts a received fused digital signal into a fused analog signal; performs power amplification on the fused analog signal, and transmits an amplified analog signal to the analog frequency divider of the Combo component. The analog frequency divider performs frequency division on the fused analog signal received by the analog frequency divider itself to obtain a loudspeaker analog signal and a motor analog signal correspondingly. The loudspeaker analog signal is loaded to two ends of the loudspeaker, and the motor analog signal is loaded to two ends of the motor. In this way, the loudspeaker and the motor are driven. In this process, before the digital signal of the loudspeaker and the digital signal of the motor are fused with each other, a pre-distortion treatment needs to be performed on the digital signal of the loudspeaker to eliminate distortion in a sound pressure output from the loudspeaker. However, the analog frequency divider causes distortion in frequency response amplitudes and phases, as a result, the loudspeaker analog signal, which is actually loaded to the two ends of the loudspeaker, and the motor analog signal, which is actually loaded to the two ends of the motor, are distorted. Therefore, a large difference is generated between an actual loudspeaker analog signal and a desired loudspeaker digital signal, and a large difference is generated between an actual motor analog signal and a desired motor digital signal, such that the loudspeaker and the motor do not operate as expected, an operation effect of the Combo component is affected significantly, user experience is reduced, the pre-distortion treatment performed on the digital signal of the loudspeaker is ineffective, and the distortion in the sound pressure output from the loudspeaker is even more serious.

Therefore, the above method of driving the Combo component needs to be improved.

SUMMARY

The present disclosure provides a Combo system and a method of driving a Combo system.

In a first aspect, a Combo system is provided and includes: a loudspeaker, a motor connected in series with the loudspeaker, an analog frequency divider connected to the loudspeaker and the motor, a power amplifier connected to the analog frequency divider, a signal fuser connected to the power amplifier, and a nonlinear compensator connected to the signal fuser. The nonlinear compensator is configured to generate a loudspeaker pre-distorted digital signal, wherein the loudspeaker pre-distorted digital signal comprises an original loudspeaker pre-distorted digital signal generated by the nonlinear compensator pre-distorting a loudspeaker digital signal of the loudspeaker; the signal fuser is configured to fuse the loudspeaker pre-distorted digital signal with a motor digital signal of the motor to obtain a fused digital signal; the power amplifier is configured to perform digital-to-analog conversion on the fused digital signal to obtain a fused analog signal and to perform power amplification on the fused analog signal; the analog frequency divider is configured to perform frequency division on the fused analog signal that is power-amplified to obtain a loudspeaker analog signal and a motor analog signal, the loudspeaker analog signal is configured to drive the loudspeaker, and the motor analog signal is configured to drive the motor. The Combo system further includes a frequency-division predictor connected to the nonlinear compensator; the frequency-division predictor is configured to predict voltage data loaded on two ends of the loudspeaker if the fused digital signal is transmitted to the analog frequency divider and is divided by the analog frequency divider, the nonlinear compensator is further configured to correct the original loudspeaker pre-distorted digital signal based on the voltage data to obtain a corrected loudspeaker pre-distorted digital signal and enable a phase of the loudspeaker analog signal to be consistent with a phase of the corrected loudspeaker pre-distorted digital signal and enable an amplitude of the loudspeaker analog signal to be consistent with an amplitude of the corrected loudspeaker pre-distorted digital signal, the loudspeaker pre-distorted digital signal further comprises the corrected loudspeaker pre-distorted digital signal.

In a second aspect, a method of driving a Combo system is provided and includes: obtaining, by a nonlinear compensator, a loudspeaker pre-distorted digital signal, wherein the loudspeaker pre-distorted digital signal comprises an original loudspeaker pre-distorted digital signal, the original loudspeaker pre-distorted digital signal is obtained by the nonlinear compensator pre-distorting a loudspeaker digital signal of a loudspeaker; fusing, by a signal fuser, the loudspeaker pre-distorted digital signal with a motor digital signal of a motor to obtain a fused digital signal; performing, by a power amplifier, digital-to-analog conversion on the fused digital signal to obtain a fused analog signal, and performing, by the power amplifier, power amplification on the fused analog signal; performing, by an analog frequency divider, frequency division on the fused analog signal that is power-amplified to obtain a loudspeaker analog signal and a motor analog signal, wherein the loudspeaker analog signal is configured to drive the loudspeaker, and the motor analog signal is configured to drive the motor; predicting, by a frequency-division predictor, voltage data loaded on two ends of the loudspeaker if the fused digital signal is transmitted to the analog frequency divider and divided by the analog frequency divider; and correcting, by the nonlinear compensator, the original loudspeaker pre-distorted digital signal based on the voltage data to obtain a corrected loudspeaker pre-distorted digital signal to enable a phase of the loudspeaker analog signal to be consistent with a phase of the corrected loudspeaker pre-distorted digital signal and enable am amplitude of the loudspeaker analog signal to be consistent with an amplitude of the corrected loudspeaker pre-distorted digital signal, wherein the loudspeaker pre-distorted digital signal comprises the corrected loudspeaker pre-distorted digital signal.

According to the present disclosure, the non-linear compensator pre-distorts the loudspeaker digital signal to obtain the loudspeaker pre-distorted digital signal. The signal fuser fuses the loudspeaker pre-distorted digital signal with the motor digital signal to obtain the fused digital signal. The power amplifier performs analogue-to-digital conversion on the fused digital signal to obtain the fused analogue signal, and amplifies the fused analogue signal. The analogue frequency divider divides the power-amplified analogue signal to obtain the loudspeaker analogue signal to drive the loudspeaker and to obtain the motor analogue signal to drive the motor. In this process, since the frequency-division predictor predicts the voltage data loaded on two ends of the loudspeaker if the fused digital signal is transmitted to the analog frequency divider and is divided by the analog frequency divider, and the non-linear compensator corrects the loudspeaker pre-distorted digital signal based on the voltage data, the loudspeaker analogue signal that is actually loaded on the two ends of the loudspeaker can be consistent with, based on the corrections, the desired loudspeaker pre-distorted digital signal. In this way, the pre-distortion treatment, which is performed by the nonlinear compensator on the loudspeaker digital signal, is ensured to be effective, allowing the loudspeaker of the Combo component to operate as expected, and distortion in the sound pressure output from the loudspeaker is reduced.

BRIEF DESCRIPTION OF THE DRAWINGS

In order to more clearly illustrate the technical solutions in the related art or in embodiments of the present disclosure, the following for describing the art or the embodiments of the present disclosure will be introduced in brief in the following. Obviously, the following accompanying drawings show only some of but not all of the embodiments of the present disclosure. Any ordinary skilled person in the prior art can obtain other drawings based on the following drawings without making any creative work.

DETAILED DESCRIPTION

Figure 1:
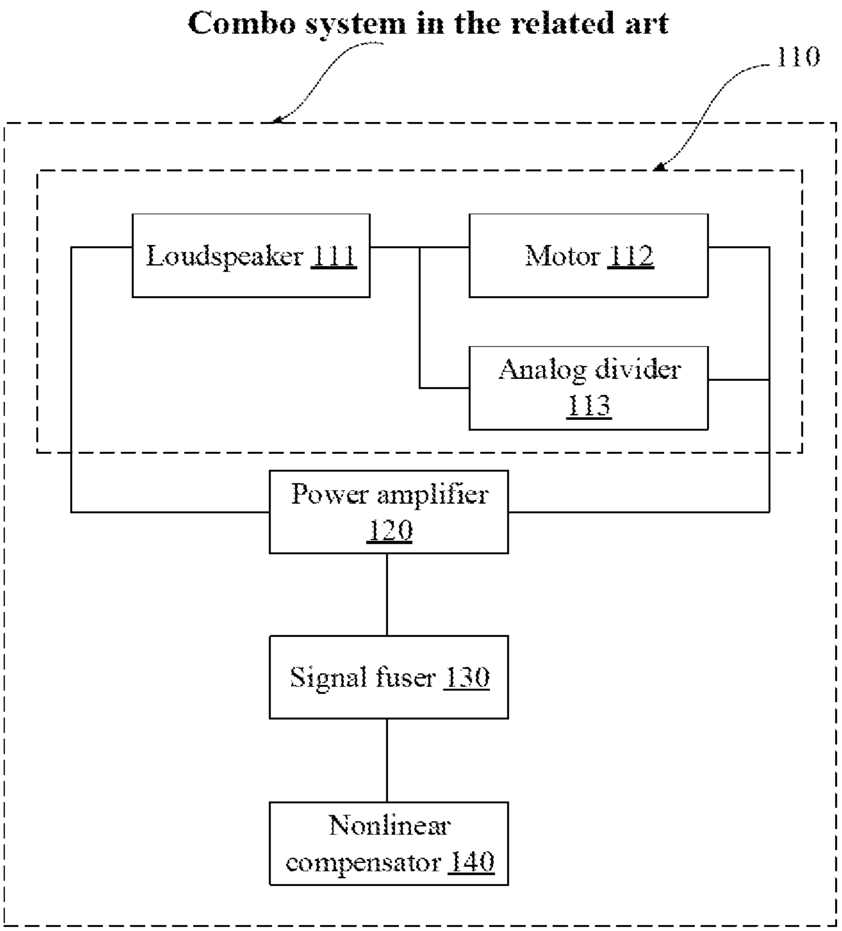
FIG. 1 RELATED ART
FIG. 1 is a block diagram of modules of a Combo system in the related art.

In order to make the objectives, technical solutions, and advantages of the present disclosure more obvious and understandable, the present disclosure will be described clearly and completely in the following by referring to embodiments of the present disclosure and the corresponding accompanying drawings. A same or similar reference numeral from the beginning to the end of the description denote a same or similar element or elements having a same or similar function. It should be understood that the various embodiments of the present disclosure described herein are only for explaining the present disclosure and do not limit the present disclosure. That is, all other embodiments, which are obtained by any ordinary skilled person in the related art based on the various embodiments of the present disclosure and without making creative work, shall fall within the scope of the present disclosure. In addition, technical features described below in the various embodiments of the present disclosure can be combined with each other as long as the features do not conflict with each other.

Figure 2:
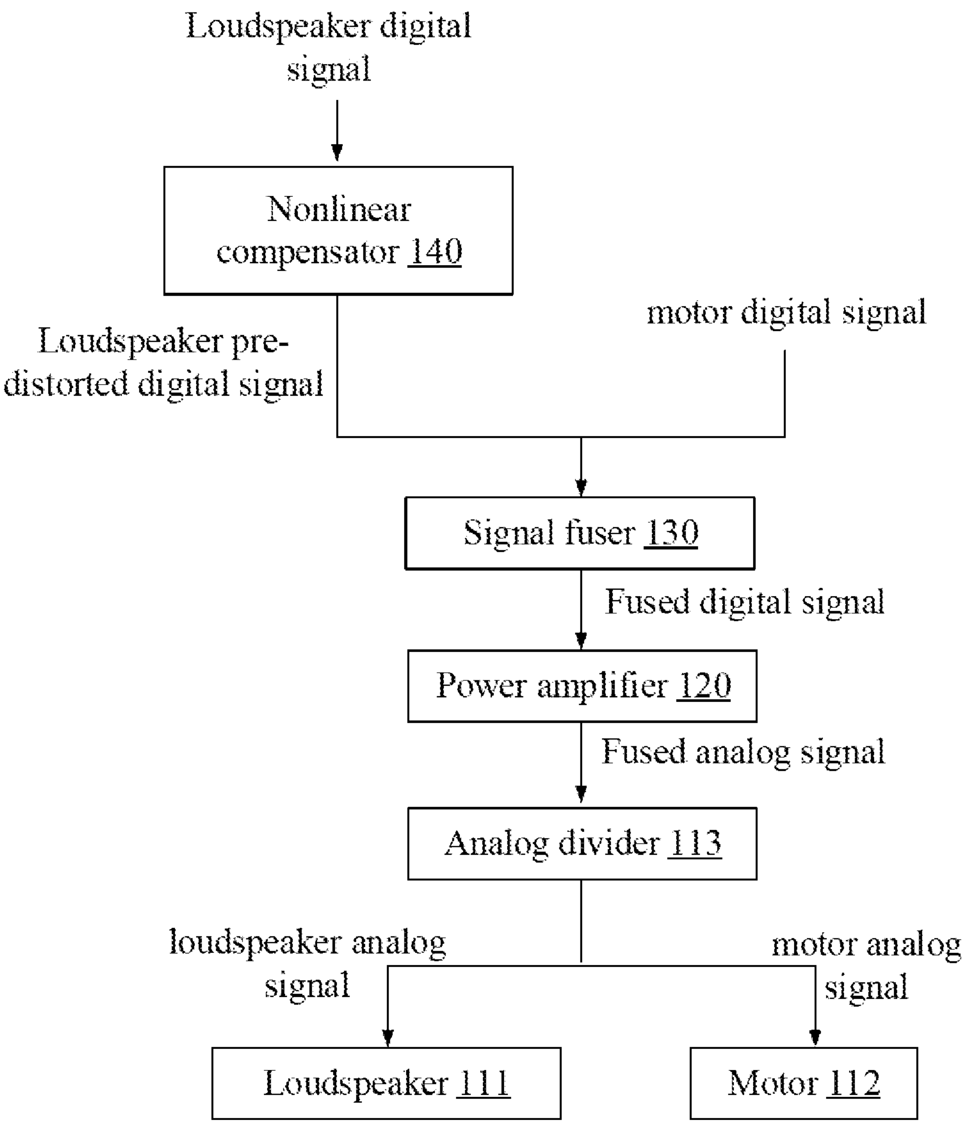
FIG. 2 RELATED ART
FIG. 2 is a schematic diagram showing signal transmission in the Combo system in the related art.

FIG. 1 is a block diagram of modules of a Combo system in the related art. The Combo system in the related art includes a Combo component 110, a power amplifier 120 connected to the Combo component 110, a signal fuser 130 connected to the power amplifier 120, and a nonlinear compensator 140 connected to the signal fuser 130. The Combo component 110 includes a loudspeaker 111, a motor 112, and an analog frequency divider 113. The motor 112 is connected in series with the loudspeaker 111. The analog frequency divider 113 is connected to the loudspeaker 111 and the motor 112. The power amplifier 120 is connected to the analog frequency divider 113. FIG. 2 is a schematic diagram showing signal transmission in the Combo system in the related art. In practice, the nonlinear compensator 140 performs a pre-distortion treatment on a loudspeaker digital signal of the loudspeaker to obtain a pre-distorted digital signal of the loudspeaker correspondingly. The signal fuser 130 fuses the pre-distorted digital signal of the loudspeaker with a motor digital signal of the motor to obtain a fused digital signal correspondingly. The power amplifier 120 performs digital-to-analog conversion on the fused digital signal to obtain a fused analog signal, correspondingly; and performs power amplification on the fused analog signal. The analog frequency divider 113 performs frequency division on the fused analog signal that is power-amplified to obtain a loudspeaker analog signal configured to drive the loudspeaker and obtain a motor analog signal configured to drive the motor. For the Combo system in the related art, the nonlinear compensator 140 performs the pre-distortion treatment on the loudspeaker digital signal to nonlinearly compensate for distortion in a sound pressure output from the loudspeaker 111, such that the distortion is eliminated. The analog frequency divider 113 is configured as a separated capacitor component or a frequency divider circuit formed by a capacitor, an inductor, and a resistor. The frequency division performed on the fused analog signal by the analog frequency divider 113 is equivalent to voltage division performed on the fused analog signal by the capacitor.

Figure 3:
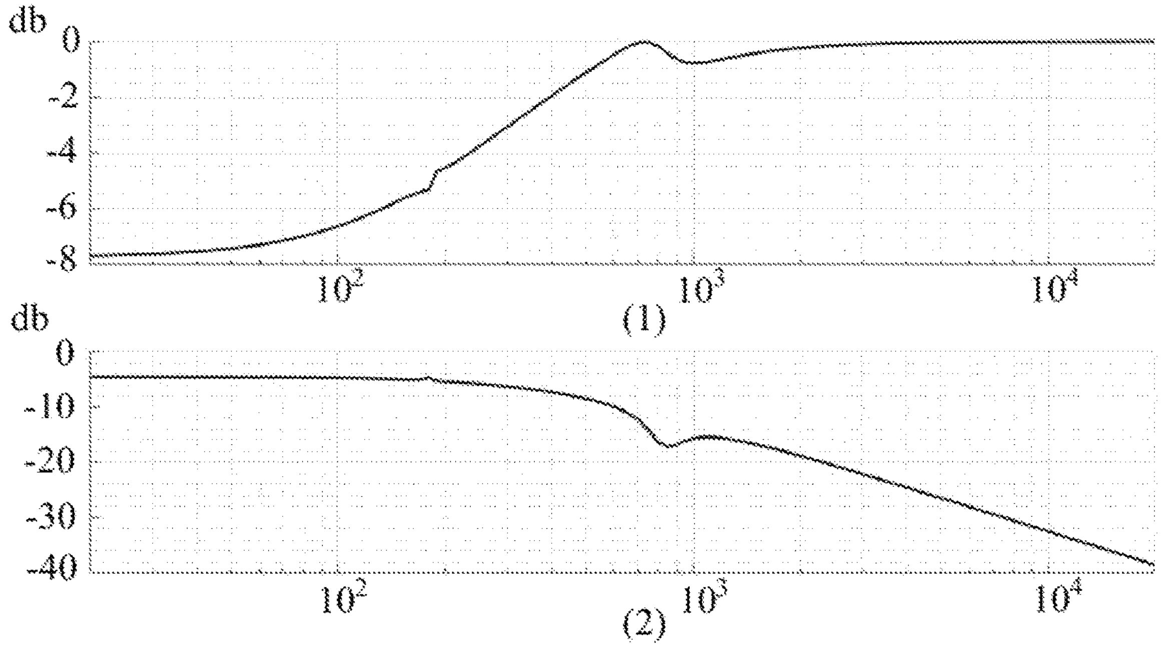
FIG. 3 RELATED ART
FIG. 3 is a schematic diagram showing distortion in an amplitude in a frequency domain of the loudspeaker analog signal loaded to two ends of the loudspeaker and distortion in an amplitude in the frequency domain of the motor analog signal loaded to two ends of the motor in the Combo system in the prior art.
Figure 4:
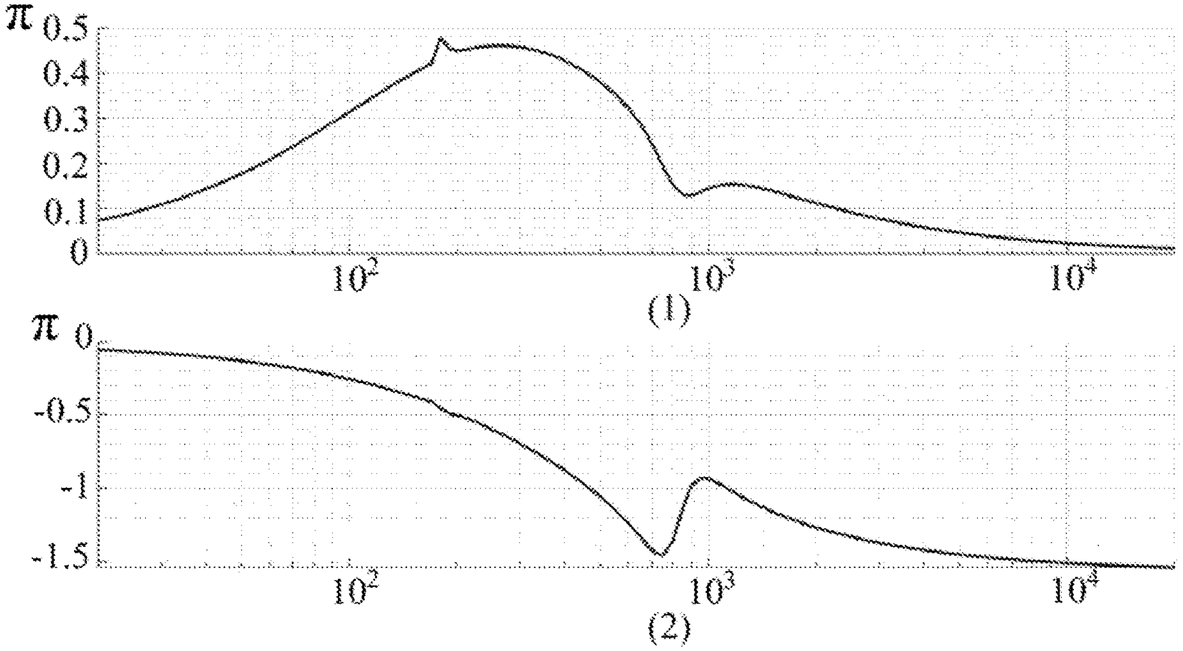
FIG. 4 RELATED ART
FIG. 4 is a schematic diagram showing distortion in a phase in the frequency domain of the loudspeaker analog signal loaded to two ends of the loudspeaker and distortion in a phase in the frequency domain of the motor analog signal loaded to two ends of the motor in the conventional Combo system in the prior art.
Figure 5:
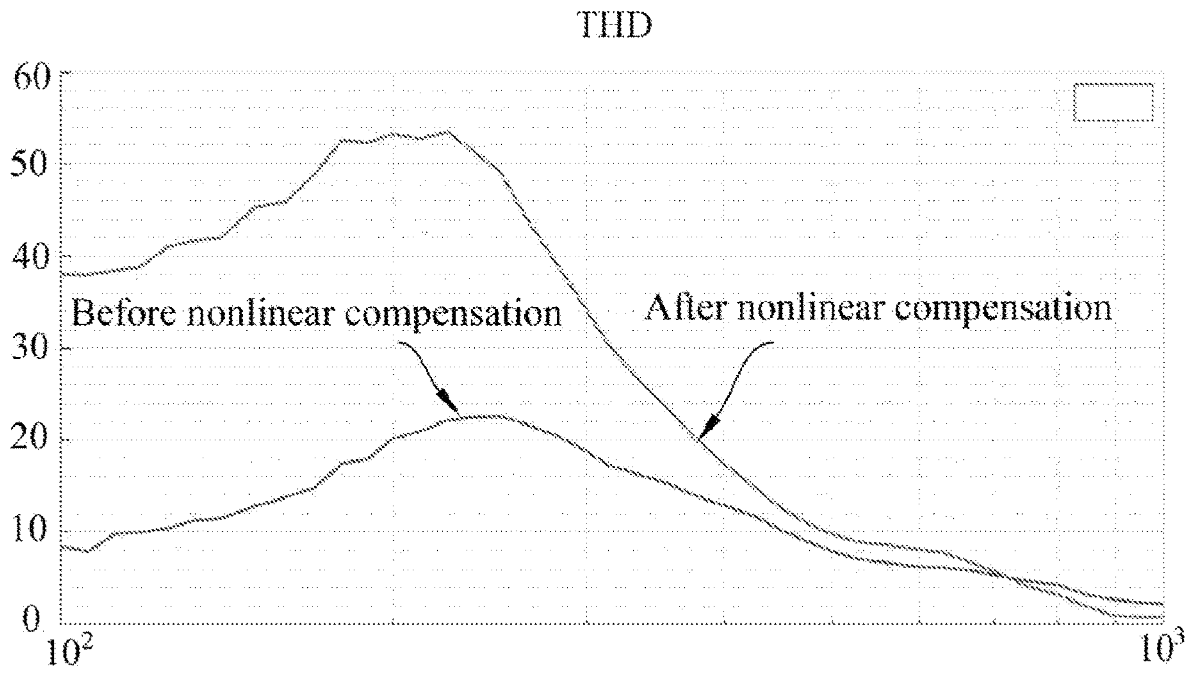
FIG. 5 RELATED ART
FIG. 5 is a comparison schematic diagram of a total harmonic distortion (THD) of the Combo system before being nonlinearly compensated and a THD of the Combo system after being nonlinearly compensated in the Combo system in the prior art.

However, for the Combo system in the related art, the analog frequency divider 113 causes distortion in frequency response amplitudes and phases, as a result, the loudspeaker analog signal, which is actually loaded to the two ends of the loudspeaker 111, and the motor analog signal, which is actually loaded to the two ends of the motor 112, are distorted (As shown in FIG. 3 and FIG. 4, a panel (1) in FIG. 3 and a panel (1) in FIG. 4 correspond to the loudspeaker 111, and a panel (2) in FIG. 3 and a panel (2) in FIG. 4 correspond to the motor 112). Therefore, a large difference is generated between an actual loudspeaker analog signal and a desired loudspeaker digital signal, and a large difference is generated between an actual motor analog signal and a desired motor digital signal, such that the loudspeaker 111 and the motor 112 do not operate as expected, an operation effect of the Combo component 110 is affected significantly, user experience is reduced, the pre-distortion treatment performed by the nonlinear compensator 140 on the loudspeaker digital signal of the loudspeaker is ineffective, and the distortion in the sound pressure output from the loudspeaker 111 is even more serious (as shown in FIG. 5, the THD indicates total harmonic distortion). Therefore, the present disclosure provides improvements on the Combo system in the related art, and the Combo system 100 provided by the present disclosure will be described in detail below.

Figure 6:
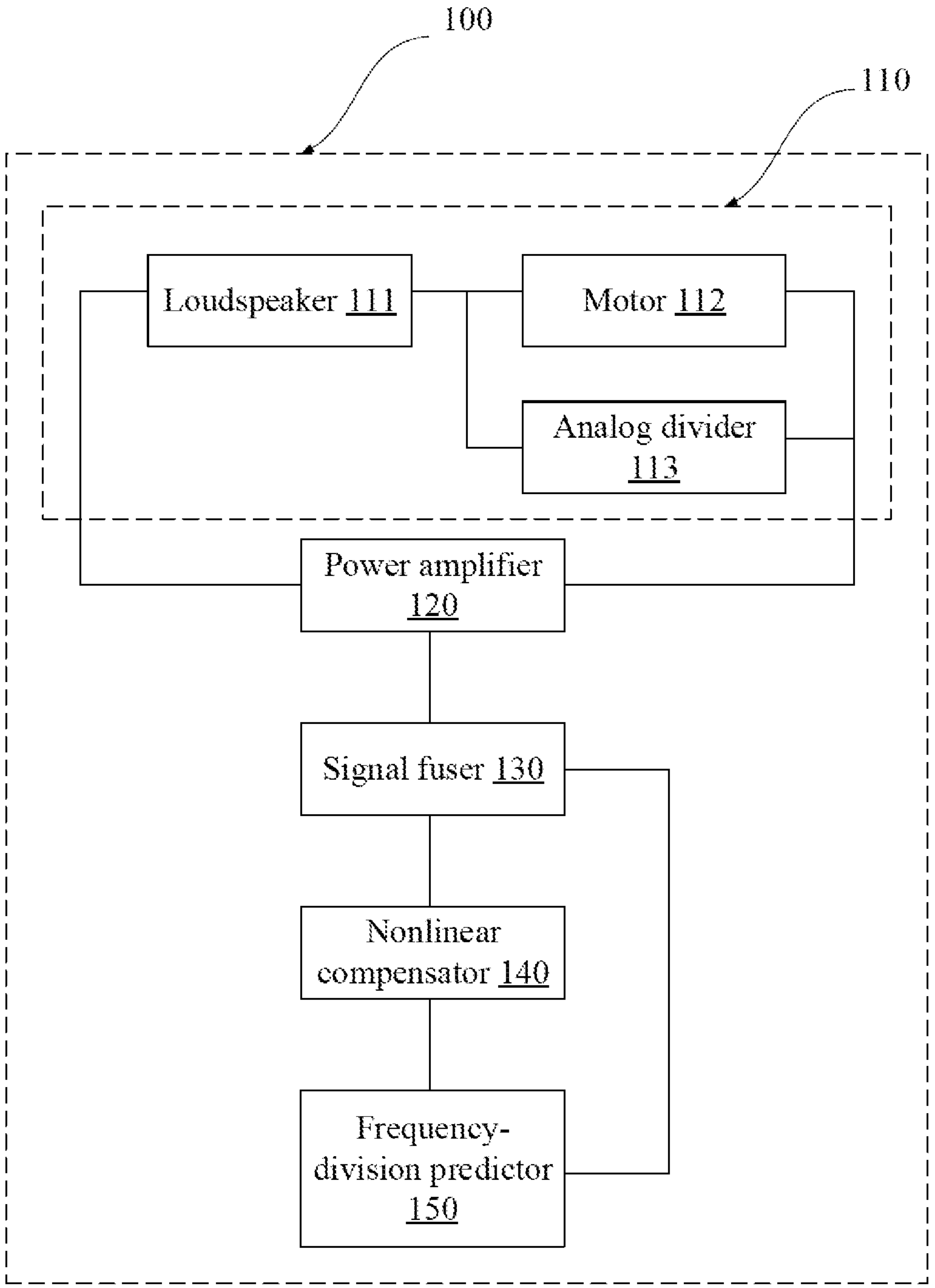
FIG. 6 is a block diagram of modules of a Combo system according to one embodiment of the present disclosure.
Figure 7:
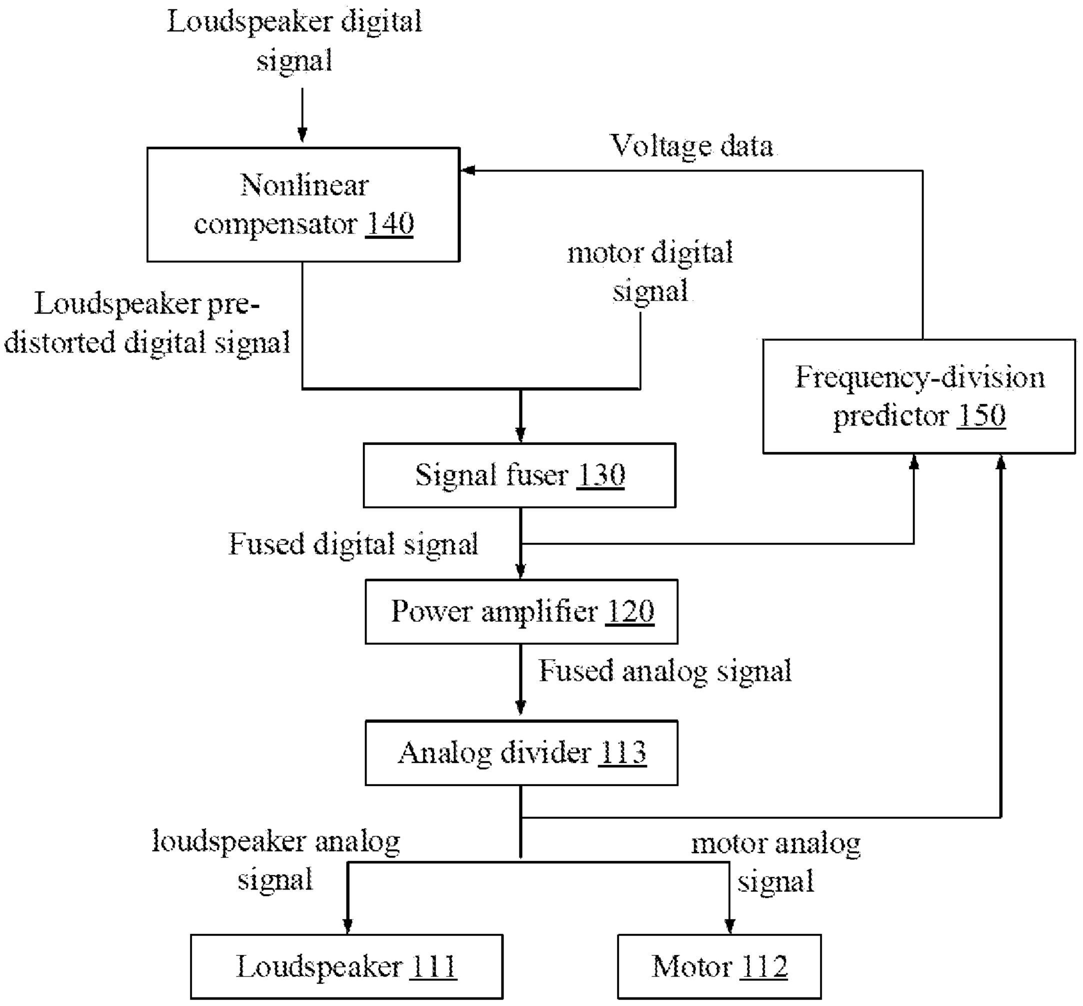
FIG. 7 is a schematic diagram showing signal transmission in the Combo system according to one embodiment of the present disclosure.

FIG. 6 is a block diagram of modules of a Combo system according to one embodiment of the present disclosure. In some embodiments, the Combo system 100 includes a Combo component 110, a power amplifier 120 electrically connected to the Combo component 110, a signal fuser 130 electrically connected to the power amplifier 120, a nonlinear compensator 140 electrically connected to the signal fuser 130, and a frequency-division predictor 150 electrically connected to the nonlinear compensator 140. The Combo component 110 includes a speaker 111, a motor 112, and an analog frequency divider 113. The motor 112 is connected in series with the loudspeaker 111, the analog frequency divider 113 is electrically connected to the loudspeaker 111 and the motor 112. The power amplifier 120 is electrically connected to the analog frequency divider 113. Specifically, FIG. 7 is a schematic diagram showing signal transmission in the Combo system according to one embodiment of the present disclosure. In practice, the nonlinear compensator 140 pre-distorts a loudspeaker digital signal of the loudspeaker to obtain a loudspeaker pre-distorted digital signal. The signal fuser 130 fuses the loudspeaker pre-distorted digital signal with a motor digital signal of the motor to obtain a fused digital signal. The power amplifier 120 performs digital-to-analog conversion on the fused digital signal to obtain a fused analog signal; and performs power amplification on the fused analog signal. The analog frequency divider 113 performs frequency division on the fused analog signal that is power-amplified to obtain a loudspeaker analog signal to drive the loudspeaker and obtain a motor analog signal to drive the motor.

Figure 8:
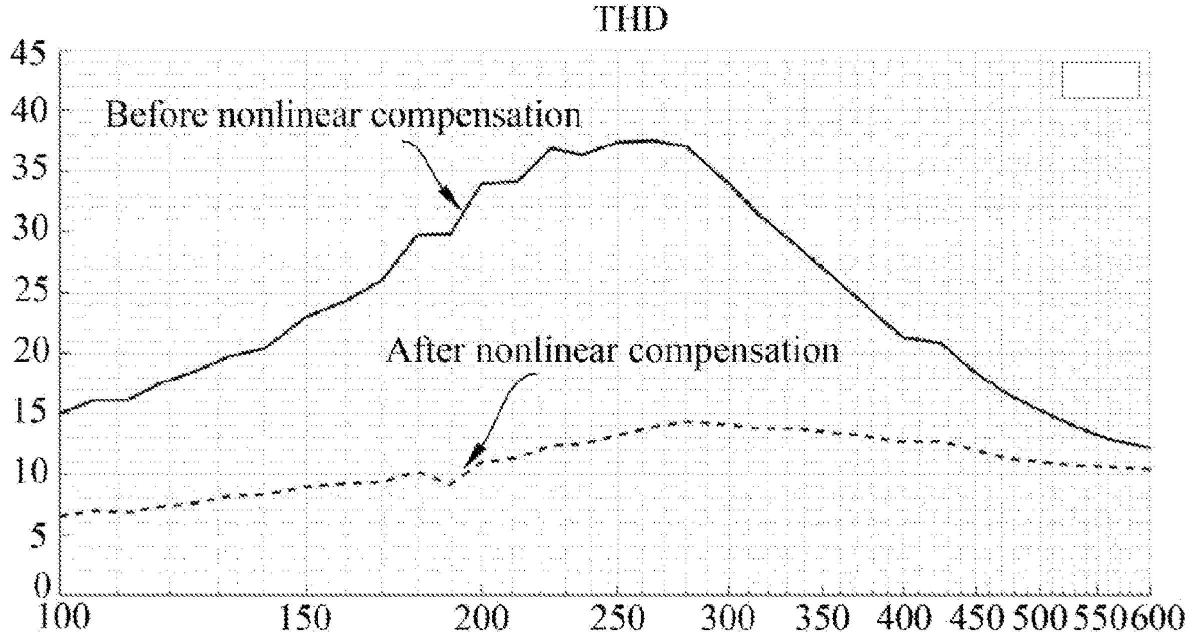
FIG. 8 is a comparison schematic diagram of a THD of the Combo system before being nonlinearly compensated and a THD of the Combo system after being nonlinearly compensated in the Combo system according to one embodiment of the present disclosure.

However, unlike the Combo system in the related art, when the signal fuser 130 of the present embodiment fuses the loudspeaker pre-distorted digital signal with the motor digital signal, the frequency-division predictor 150 predicts the voltage data loaded to the two ends of the loudspeaker 111 if the fused digital signal is transmitted to the analog frequency divider 113 and divided by the analog frequency divider 113. The nonlinear compensator 140 corrects the loudspeaker pre-distorted digital signal based on the voltage data. Further, the corrected loudspeaker pre-distorted digital signal and the motor digital signal are fused with each other by the signal fuser 130, and the fused digital signal is transmitted to the power amplifier 120. The correction enables the loudspeaker analog signal that is actually loaded to the two ends of the loudspeaker 111 to be consistent with the corrected loudspeaker pre-distorted digital signal thereof. In detail, the phase of the loudspeaker analog signal that is actually loaded to the two ends of the loudspeaker 111 is consistent with the phase of the corrected loudspeaker pre-distorted digital signal, and the amplitude of the loudspeaker analog signal that is actually loaded to the two ends of the loudspeaker 111 is consistent with the amplitude of the corrected loudspeaker pre-distorted digital signal. In this way, the pre-distortion treatment, which is performed by the nonlinear compensator 140 on the loudspeaker digital signal, is ensured to be effective, allowing the loudspeaker 111 of the Combo component 110 to operate as expected, and the distortion in the sound pressure output from the loudspeaker 111 is reduced (as shown in FIG. 8). Of course, the frequency-division predictor 150 in the present embodiment further predicts voltage data loaded to the two ends of the motor 112 if the fused digital signal is transmitted to the analog frequency divider 113 and divided by the analog frequency divider 113. In this way, the motor digital signal is corrected accordingly, enabling the motor analog signal that is actually loaded on the two ends of the motor 112 to be consistent with the corrected motor digital signal. In detail, the phase of the motor analog signal that is actually loaded on the two ends of the motor 112 is consistent with the phase of the motor digital signal, and the amplitude of the motor analog signal that is actually loaded on the two ends of the motor 112 is consistent with the amplitude of the motor digital signal.

In one embodiment, in the process of predicting the voltage data loaded on the two ends of the loudspeaker 111 if the fused digital signal is transmitted to the analog frequency divider 113 and divided by the analog frequency divider 113 performs the frequency division, the frequency-division predictor 150 firstly obtains a circuit parameter (a linear parameter and/or a nonlinear parameter) of the analog frequency divider 113, a circuit parameter of the loudspeaker 111, and a circuit parameter of the motor 112. Further, the frequency-division predictor 150 predicts, based on the obtained circuit parameters, the voltage data loaded on the two ends of the loudspeaker 111 if the fused digital signal is transmitted to the analog frequency divider 113 and divided by the analog frequency divider 113. In the process of correcting the loudspeaker pre-distorted digital signal, the nonlinear compensator 140 corrects the phase and/or the amplitude of the loudspeaker pre-distorted digital signal in the frequency domain. In addition, it is noted that the process of correcting the motor digital signal is similar to the process of correcting the loudspeaker pre-distorted digital signal mentioned above, which will not be repeated herein.

In one embodiment, when signals are being transmitted, deviation occurs, and the circuits themselves have subtle defects. That is, when the loudspeaker pre-distorted digital signal is corrected only once, a desired effect is not achieved. Therefore, in the present embodiment, the frequency-division predictor 150 is further connected to the analog frequency divider 113, and the analog frequency divider 113 transmits the loudspeaker analog signal to the frequency-division predictor 150. After correcting the loudspeaker pre-distorted digital signal for a first time, the frequency-division predictor 150 further determines whether the loudspeaker analog signal is the same as the corrected loudspeaker pre-distorted digital signal; and determines, based on a determination result, whether to correct the loudspeaker pre-distorted digital signal again. In some embodiments, in the process of determining, based on the determination result, whether to correct the loudspeaker pre-distorted digital signal again, the frequency-division predictor 150 determines to not correct the loudspeaker pre-distorted digital signal again in response to a similarity between the loudspeaker analog signal and the corrected loudspeaker pre-distorted digital signal being greater than or equal to a predetermined similarity threshold. The frequency-division predictor 150 determines to correct the corrected loudspeaker pre-distorted digital signal again in response to the similarity between the loudspeaker analog signal and the corrected loudspeaker pre-distorted digital signal being less than the predetermined similarity threshold.

In one embodiment, when the loudspeaker pre-distorted digital signal is corrected for a plurality of times, and when the similarity between the loudspeaker analog signal and the loudspeaker pre-distorted digital signal at a current time point is still less than the predetermined similarity threshold, it is indicated that the various components in the Combo system 100 have certain problems. In this case, the Combo system 100 needs to be shut down for troubleshooting. Specifically, the Combo system 100 in the present embodiment further includes, in addition to the components in the above embodiments, a master controller (not shown in the drawings) configured to start or shut down the Combo system 100. In this case, the nonlinear compensator 140 is further configured to send a command of shutting down the Combo system 100 to the master controller to enable the master controller to shut down the Combo system 100, in response to the number of times that the nonlinear compensator 140 corrects the loudspeaker pre-distorted digital signal reaching a predetermined number of times, and at a current time point, the similarity between the loudspeaker analog signal and the loudspeaker pre-distorted digital signal being less than the predetermined similarity threshold.

The above embodiments show only preferred embodiments of the present disclosure, but are not the only limitation of the Combo System 100. In this regard, any ordinary skilled person in the related art can flexibly configure the Combo System 100 based on actual application scenarios and based on the above embodiments.

Figure 9:
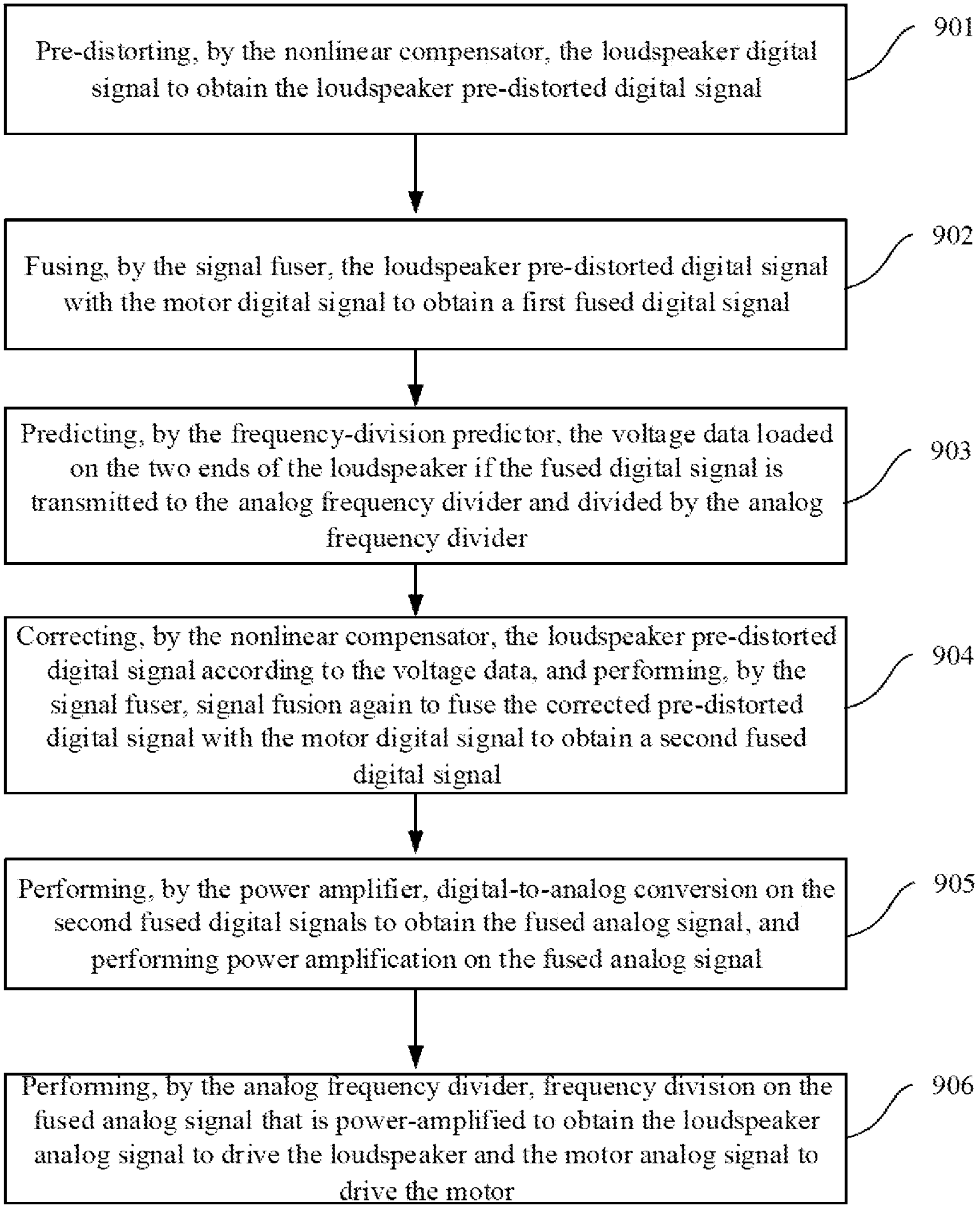
FIG. 9 is a flow chart of a method of driving the Combo system according to one embodiment of the present disclosure.

FIG. 9 is a flow chart of a method of driving the Combo system according to one embodiment of the present disclosure. The present disclosure further provides a method of driving the Combo system. The method is performed by the Combo system 100 in the above embodiments of the present disclosure. In some embodiments, the method includes following operations. In an operation 901, the nonlinear compensator 140 pre-distorts the loudspeaker digital signal to obtain the loudspeaker pre-distorted digital signal correspondingly. In an operation 902, the signal fuser 130 fuses the loudspeaker pre-distorted digital signal with the motor digital signal to obtain a first fused digital signal correspondingly. In an operation 903, the frequency-division predictor 150 predicts the voltage data loaded on the two ends of the loudspeaker 111 if the fused digital signal is transmitted to the analog frequency divider 113 and divided by the analog frequency divider 113. In an operation 904, the nonlinear compensator 140 corrects the loudspeaker pre-distorted digital signal according to the voltage data, and the signal fuser performs signal fusion again to fuse the corrected pre-distorted digital signal with the motor digital signal to obtain a second fused digital signal. In an operation 905, the power amplifier 120 performs digital-to-analog conversion on the second fused digital signals to obtain the fused analog signal correspondingly, and performs power amplification on the fused analog signal. In an operation 906, the analog frequency divider 113 performs frequency division on the fused analog signal that is power-amplified to obtain the loudspeaker analog signal to drive the loudspeaker 111 and the motor analog signal to drive the motor 112.

In one embodiment, the operation of correcting the loudspeaker pre-distorted digital signal according to the voltage data in the operation 904 includes the following. The phase and/or the amplitude of the loudspeaker pre-distorted digital signal is corrected in the frequency domain according to the voltage data.

In one embodiment, the method of driving the Combo system described in the above embodiments further include the following. After the loudspeaker pre-distorted digital signal is corrected for the first time, the frequency-division predictor 150 determines whether or not the loudspeaker analog signal is the same as the loudspeaker pre-distorted digital signal to obtain a first determination result; and determines whether or not to correct the loudspeaker pre-distorted digital signal again based on the first determination result. In some embodiments, the operation of determining whether or not to correct the loudspeaker pre-distorted digital signal again based on the first determination result includes the following. The frequency-division predictor 150 determines not to correct the loudspeaker pre-distorted digital signal again in response to the similarity between the loudspeaker analog signal and the loudspeaker pre-distorted digital signal being greater than or equal to the predetermined similarity threshold. The frequency-division predictor 150 determines to correct the loudspeaker pre-distorted digital signal again in response to the similarity between the loudspeaker analog signal and the loudspeaker pre-distorted digital signal being less than the predetermined similarity threshold.

In one embodiment, the method of driving the Combo system described in the above embodiments further includes the following. The nonlinear compensator 140 sends the command of shutting down the Combo system 100 to the master controller, in response to the number of times that the loudspeaker pre-distorted digital signal is corrected reaching the predetermined number of times and the similarity between the loudspeaker analog signal and the loudspeaker pre-distorted digital signal at the current time point being less than the predetermined similarity threshold, such that the master controller shuts down the Combo system 100.

The above embodiments show only optional embodiments of the present disclosure, rather than the only limitation of the method of driving the Combo system. In this regard, any ordinary skilled person in the related art can flexibly perform the method based on actual application scenarios and based on the above embodiments.

The operations of the method or algorithm described by referring to the embodiments of the present disclosure can be implemented directly by hardware, a software module executed by a processor, or a combination of both. The software module is configured in a random access memory (RAM), an internal memory, a read-only memory (ROM), an electrically programmable ROM, an electrically erasable programmable ROM, a register, a hard disk, a removable disk, a compact disc read-only memory (CD-ROM), or a storage medium in any other form in the related art.

The above embodiments are entirely or partially be implemented by software, hardware, firmware, or any combination thereof. When the embodiments are implemented by the software, it is implemented entirely or partially in a form of a computer program product. The computer program product includes one or more computer instructions. While loading and executing the computer program instructions on a computer, a process or function in accordance with the present disclosure is generated entirely or partially. The computer is a general-purpose computer, a specialized computer, a computer network, or other programmable devices. The computer instructions are stored in a computer-readable storage medium or transmitted from one computer-readable storage medium to another computer-readable storage medium. For example, the computer instructions are transmitted from a network site, a computer, a server, or a data center to another network site, another computer, another server, or another data center by wires (such as coaxial cables, fiber optics, digital subscriber lines) or in a wireless manner (such as infrared, wireless, microwave, and so on). The computer-readable storage medium is any usable medium to which a computer can store data and read data, or is a data storage device, such as a server, a data center, etc., that includes and integrates one or more usable media. The usable medium is a magnetic medium (such as a floppy disk, a hard disk, a tape), an optical medium (such as DVD), or a semiconductor medium (such as a solid state disk).

To be noted that various embodiments in the present disclosure are described in a progressive manner. Each embodiment focuses on a difference with other embodiments, and the common parts of the various embodiments are referred to each other. The product embodiments, au be similar to the method embodiments, and therefore, the product embodiments are described relatively simply, and any relevant part is referred to the description of the method embodiments.

To be noted that any relational term, such as first and second, is used in the present disclosure only to distinguish one feature or one operation from another one, but does not require or imply the described features or operations have an actual relationship or an order. Furthermore, the terms "including", "comprising", or any other variant thereof, are intended to cover non-exclusive inclusion. Therefore, a process, a method, an article, or an apparatus including a set of elements includes not only the listed elements but also other elements that are not expressly listed or other elements that are inherently included in the process, the method, the article, or the apparatus. Without further limitation, an element defined by the expression of "including a . . . " does not preclude presence of extra identical elements in the process, the method, the article or the apparatus.

The above description of the embodiments enables any ordinary skilled person in the related art to achieve or use contents of the present disclosure. Various modifications to these embodiments are obvious to any ordinary skilled person in the related art. A general principle defined in the present disclosure is achieved in other embodiments without departing from the spirit or scope of the present disclosure. Therefore, the present disclosure is not limited to these embodiments shown in the present disclosure, but will be subject to the widest scope consistent with the principles and novel features disclosed in the present disclosure.

What is claimed is:

1. A Combo system, comprising: a loudspeaker, a motor connected in series with the loudspeaker, an analog frequency divider connected to the loudspeaker and the motor, a power amplifier connected to the analog frequency divider, a signal fuser connected to the power amplifier, and a nonlinear compensator connected to the signal fuser;

wherein, the nonlinear compensator is configured to generate a loudspeaker pre-distorted digital signal, wherein the loudspeaker pre-distorted digital signal comprises an original loudspeaker pre-distorted digital signal generated by the nonlinear compensator pre-distorting a loudspeaker digital signal of the loudspeaker; the signal fuser is configured to fuse the loudspeaker pre-distorted digital signal with a motor digital signal of the motor to obtain a fused digital signal; the power amplifier is configured to perform digital-to-analog conversion on the fused digital signal to obtain a fused analog signal and to perform power amplification on the fused analog signal; the analog frequency divider is configured to perform frequency division on the fused analog signal that is power-amplified to obtain a loudspeaker analog signal and a motor analog signal, the loudspeaker analog signal is configured to drive the loudspeaker, and the motor analog signal is configured to drive the motor;

the Combo system further comprises a frequency-division predictor connected to the nonlinear compensator; the frequency-division predictor is configured to predict voltage data loaded on two ends of the loudspeaker if the fused digital signal is transmitted to the analog frequency divider and is divided by the analog frequency divider, the nonlinear compensator is further configured to correct the original loudspeaker pre-distorted digital signal based on the voltage data to obtain a corrected loudspeaker pre-distorted digital signal and enable a phase of the loudspeaker analog signal to be consistent with a phase of the corrected loudspeaker pre-distorted digital signal and enable an amplitude of the loudspeaker analog signal to be consistent with an amplitude of the corrected loudspeaker pre-distorted digital signal, the loudspeaker pre-distorted digital signal further comprises the corrected loudspeaker pre-distorted digital signal.

2. The Combo system according to claim 1, wherein when the nonlinear compensator corrects the loudspeaker pre-distorted digital signal, the nonlinear compensator is configured to correct a phase and/or an amplitude of the loudspeaker pre-distorted digital signal in a frequency domain.

3. The Combo system according to claim 1, wherein the frequency-division predictor is further connected to the analog frequency divider; and after the loudspeaker pre-distorted digital signal is corrected for a first time, the frequency-division predictor is further configured to:

determine whether the phase of the loudspeaker analog signal is consistent with the phase of corrected loudspeaker pre-distorted digital signal and whether the amplitude of the loudspeaker analog signal is consistent with the amplitude of corrected loudspeaker pre-distorted digital signal, to obtain a determination result; and determine whether to correct the loudspeaker pre-distorted digital signal again based on the determination result.

4. The Combo system according to claim 3, wherein in a process of determining whether to correct the loudspeaker pre-distorted digital signal again based on the determination result, the frequency-division predictor is configured to:

determine not to correct the loudspeaker pre-distorted digital signal again in response to a similarity between the loudspeaker analog signal and the loudspeaker pre-distorted digital signal being greater than or equal to a predetermined similarity threshold; and determine to correct the loudspeaker pre-distorted digital signal again in response to the similarity between the loudspeaker analog signal and the loudspeaker pre-distorted digital signal being less than the predetermined similarity threshold.

5. The Combo system according to claim 4, wherein the Combo system further comprises a master controller configured to start or shut down the Combo system; the nonlinear compensator is further configured to send a command of shutting down the Combo system to the master controller in response to the number of correction times of the loudspeaker pre-distorted digital signal reaching a predetermined number of correction times; and a similarity between the loudspeaker analog signal and the loudspeaker pre-distorted digital signal at a current time point being less than the predetermined similarity threshold.

6. The Combo system according to claim 1, wherein, the fused digital signal comprises a first fused digital signal and a second fused digital signal;

the signal fuser is configured to fuse the original loudspeaker pre-distorted digital signal with the motor digital signal to obtain the first fused digital signal;

the frequency-division predictor is configured to predict the voltage data based on the first fused digital signal, if the first fused digital signal is transmitted to the analog frequency divider and is divided by the frequency division.

7. The Combo system according to claim 6, wherein the signal fuser is configured to fuse the corrected loudspeaker pre-distorted digital signal with the motor digital signal to obtain the second fused digital signal.

8. The Combo system according to claim 7, wherein the power amplifier is configured to perform the digital-to-analog conversion on the second fused digital signal to obtain the fused analog signal and amplify the fused analog signal.

9. A method of driving a Combo system, comprising:

obtaining, by a nonlinear compensator, a loudspeaker pre-distorted digital signal, wherein the loudspeaker pre-distorted digital signal comprises an original loudspeaker pre-distorted digital signal, the original loudspeaker pre-distorted digital signal is obtained by the nonlinear compensator pre-distorting a loudspeaker digital signal of a loudspeaker;

fusing, by a signal fuser, the loudspeaker pre-distorted digital signal with a motor digital signal of a motor to obtain a fused digital signal;

performing, by a power amplifier, digital-to-analog conversion on the fused digital signal to obtain a fused analog signal, and performing, by the power amplifier, power amplification on the fused analog signal;

performing, by an analog frequency divider, frequency division on the fused analog signal that is power-amplified to obtain a loudspeaker analog signal and a motor analog signal, wherein the loudspeaker analog signal is configured to drive the loudspeaker, and the motor analog signal is configured to drive the motor;

predicting, by a frequency-division predictor, voltage data loaded on two ends of the loudspeaker if the fused digital signal is transmitted to the analog frequency divider and divided by the analog frequency divider; and correcting, by the nonlinear compensator, the original loudspeaker pre-distorted digital signal based on the voltage data to obtain a corrected loudspeaker pre-distorted digital signal to enable a phase of the loudspeaker analog signal to be consistent with a phase of the corrected loudspeaker pre-distorted digital signal and enable am amplitude of the loudspeaker analog signal to be consistent with an amplitude of the corrected loudspeaker pre-distorted digital signal, wherein the loudspeaker pre-distorted digital signal comprises the corrected loudspeaker pre-distorted digital signal.

10. The method of driving a Combo system according to claim 9, wherein the step of correcting the original loudspeaker pre-distorted digital signal based on the voltage data, comprises:

correcting a phase and/or an amplitude of the loudspeaker pre-distorted digital signal in a frequency domain.

11. The method of driving a Combo system according to claim 9, wherein, after the loudspeaker pre-distorted digital signal is corrected for a first time, the method further comprises:

determining, by the frequency-division predictor, whether the phase of loudspeaker analog signal is consistent with the phase of the corrected loudspeaker pre-distorted digital signal and whether the amplitude of loudspeaker analog signal is consistent with the amplitude of the corrected loudspeaker pre-distorted digital signal, to obtain a determination result; and determining whether to correct the loudspeaker pre-distorted digital signal again based on the determination result.

12. The method of driving a Combo system according to claim 11, wherein the step of determining whether to correct the loudspeaker pre-distorted digital signal again based on the determination result, comprises:

determining not to correct the loudspeaker pre-distorted digital signal again in response to a similarity between the loudspeaker analog signal and the loudspeaker pre-distorted digital signal being greater than or equal to a predetermined similarity threshold; and determining to correct the loudspeaker pre-distorted digital signal again in response to the similarity between the loudspeaker analog signal and the loudspeaker pre-distorted digital signal being less than the predetermined similarity threshold.

13. The method of driving a Combo system according to claim 12, further comprising:

sending, by the nonlinear compensator, a command of shutting down the Combo system to a master controller, in response to: the number of correction times of the loudspeaker pre-distorted digital signal reaching a predetermined number of correction times; and a similarity between the loudspeaker analog signal and the loudspeaker pre-distorted digital signal at a current time point being less than the predetermined similarity threshold.

14. The method of driving a Combo system according to claim 9, wherein the fused digital signal comprises a first fused digital signal and a second fused digital signal; and the method further comprises: fusing, by the signal fuser, the original loudspeaker pre-distorted digital signal with the motor digital signal to obtain the first fused digital signal;

wherein, the frequency-division predictor predicts the voltage data based on the first fused digital signal, if the first fused digital signal is transmitted to the analog frequency divider and divided by the analog frequency divider.

15. The method of driving a Combo system according to claim 14, further comprising:

fusing, by the signal fuser, the corrected loudspeaker pre-distorted digital signal with the motor digital signal to obtain the second fused digital signal.

16. The method of driving a Combo system according to claim 15, wherein the power amplifier performs digital-to-analog conversion on the second fused digital signal to obtain the fused analog signal and amplifies the fused analog signal.

* * * * *